United States Patent Office 2,747,560
Patented May 29, 1956

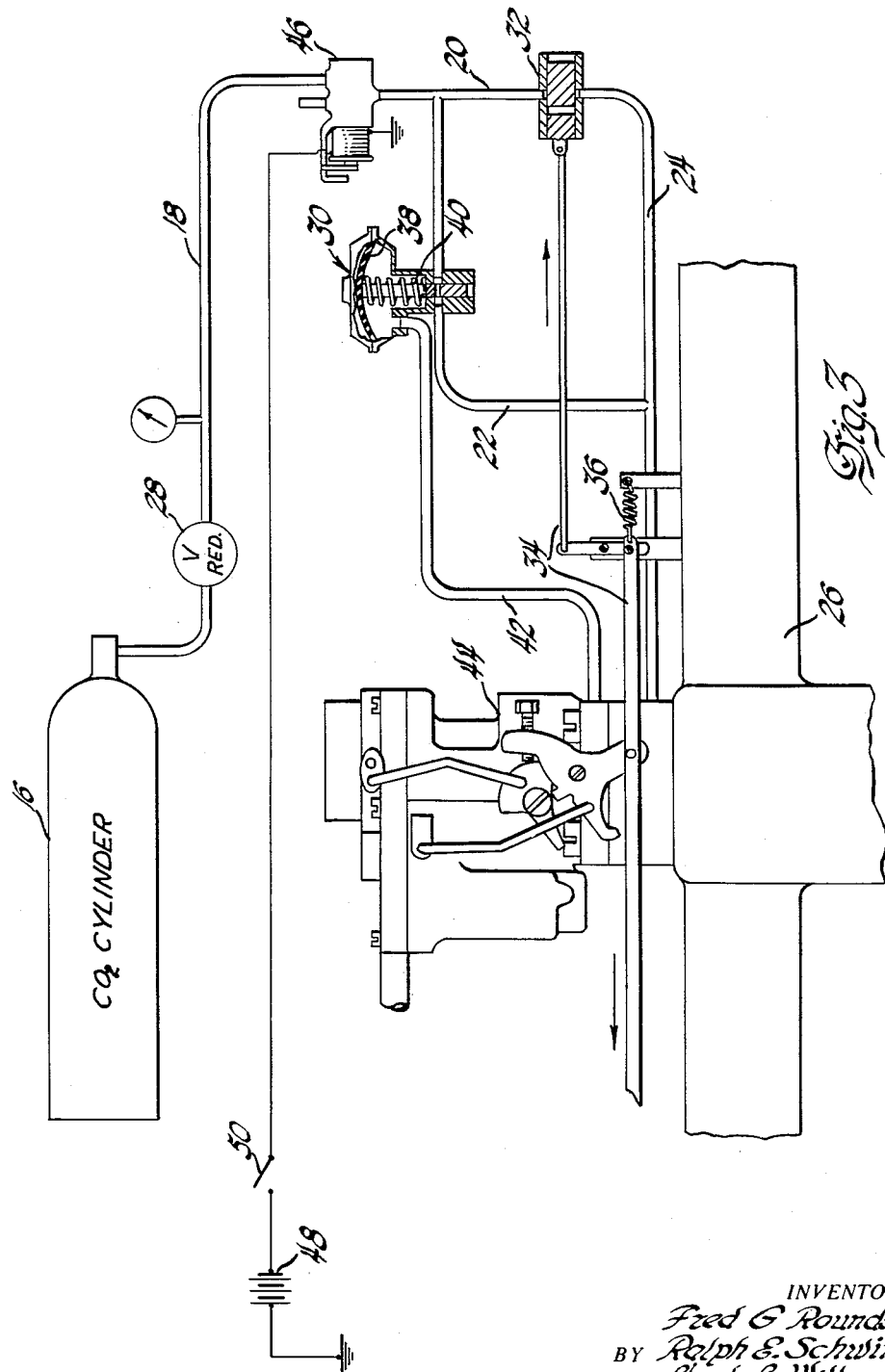

2,747,560

CARBON DIOXIDE AS AN ANTI-KNOCK AGENT

Fred G. Rounds, Ralph E. Schwind, and Lloyd L. Withrow, Detroit, Mich., assignors to General Motors Corporation, Detroit, Mich., a corporation of Delaware Application September 4, 1952, Serial No. 307,806

2 Claims. (Cl. 123—119)

This invention relates to a method of reducing detonation or engine knocking. In particular, it relates to a method of reducing engine knocking by the addition of carbon dioxide to the fuel supply system.

Engine knocking has long been a problem in the field of spark ignition engines. This nearly instantaneous explosion of a mixture of fuel and air in an internal combustion engine with resulting high pressure fluctuations is associated with self-ignition of the compressed unburned fuel air charge in the cylinder ahead of the normal combustion flame front. A large portion of the energy liberated in this premature explosion is wasted in heating up the cylinder walls, thus reducing the mechanical energy available and unnecessarily increasing the heat load of the cooling system. The extremely high temperatures encountered in the cylinders during knocking not only increase the heat load of the cooling system, however, but also damage the pistons and valves. Engine knocking with the resulting high temperatures, if not checked, will preclude proper control of combustion gas ignition by the spark plug, resulting in a serious condition of auto-ignition.

The problem of engine knocking is a serious one not only because of the wasted power and damage to the engine, but also because it limits the permissible degree of compression in an engine. Engine knocking increases with an increase in the compression pressures used. Both the maximum motor torque and the engine fuel economy also increase with an increased compression pressure. Hence, if it is necessary to reduce engine compression in order to check detonation or knocking, it is all but impossible to improve the power output and the fuel economy of the engine. In modern high compression automobile or aircraft engines the problem of knocking becomes especially acute because many of the commerically available gasolines today have a relatively low octane rating and thus increase the tendency of an engine to knock. In the past many attempts have been made to reduce engine knocking. The addition of tetraethyl lead to fuels to reduce knocking is well known. Likewise, many other chemical compounds and mixtures, such as water or alcohol-water mixtures, have been suggested as anti-knock agents. However, as of the present time no generally satisfactory solution had been found for the problem of engine knocking.

The principal object of this invention, therefore, it to provide an effective method of reducing engine knocking. A further object is to provide a method of reducing the speed of the combustion reaction in a spark ignition engine. A further object is to reduce engine knocking by the introduction of controlled amounts of carbon dioxide into the fuel supply system. A still further object is to provide a method of reducing engine knocking by the automatic injection of controlled amounts of carbon dioxide into the fuel supply system in response to the load imposed on the engine. Other objects and advantages of this invention will more fully appear in the description which follows.

In general, the practice of this invention involves introducing carbon dioxide into the engine fuel supply system. We have discovered that carbon dioxide is a singularly effective anti-knock agent which, when introduced into the engine fuel supply system in controlled amounts, reduces engine knocking and leaves no corrosive deposits in the engine. While the following description sets forth in detail certain specific embodiments of the invention, these are illustrative, however, of but a few of the various ways in which the principle of the invention may be employed.

Referring now to figures of the drawings:

Figure 3 is a schematic view, with parts broken away and in section, of an apparatus for introducing carbon dioxide into the fuel supply system of an internal combustion engine in accordance with a preferred embodiment of the invention.

Figure 1:
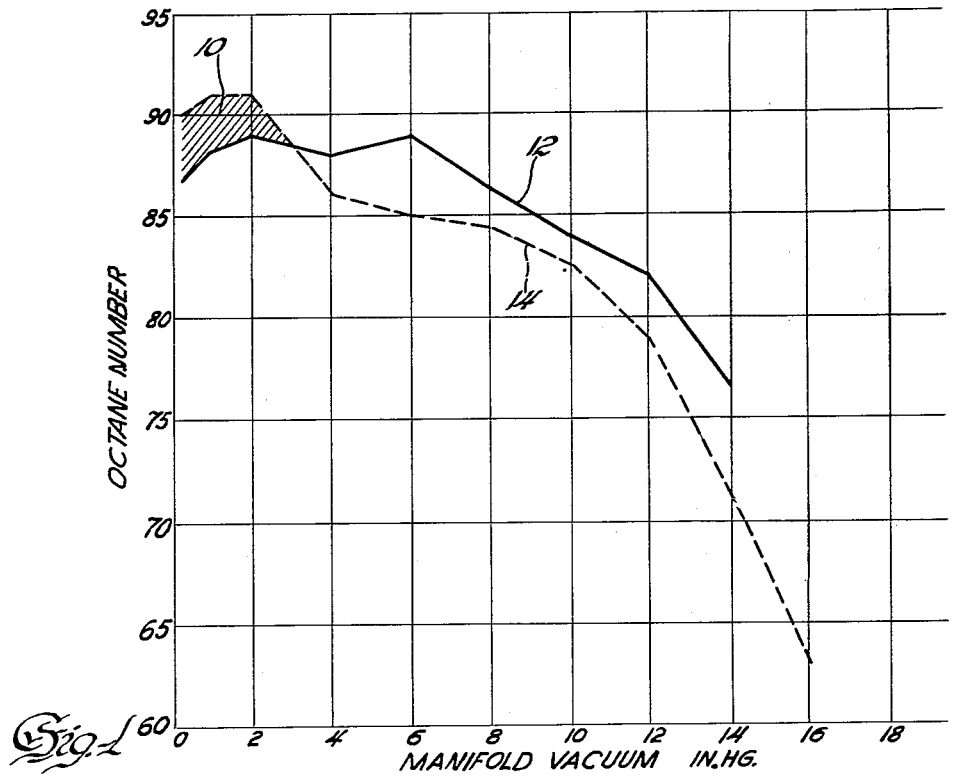
Figure 1 is a graph showing, in terms of manifold vacuum of an automobile engine, the conditions under which knocking occurs.

Referring more particularly to the drawings, in Figure 1 the shaded area 10 is a graphic representation, in terms of engine manifold vacuum, of the load conditions of an engine under which knocking will occur. The shaded area 10 thus represents the load encountered, for example, when an aircraft is taking off or when an automobile is driven up a steep hill or is accelerating rapidly. The solid line 12 represents the characteristics of a standard commercially available fuel, and the dotted line 14 indicates the engine requirements as set by the manufacturer. The solid line 12 thus is a representation of the effective octane rating of a commercial gasoline at varying manifold vacuum conditions showing how the octane number actually varies with engine load. It will be seen that under conditions of heavy engine load the octane rating of the commercial gasoline will lie beneath the engine requirement curve 14 as shown by the shaded area 10. It is under these conditions that knocking occurs. As the engine load decreases, represented by an increase in manifold vacuum, the octane rating of the fuel required to prevent knocking decreases also. While there is a similar decrease in the effective octane rating of the fuel used as the load is lessened, this octane rating remains above that required by the engine so that no knocking will occur.

Figure 2:
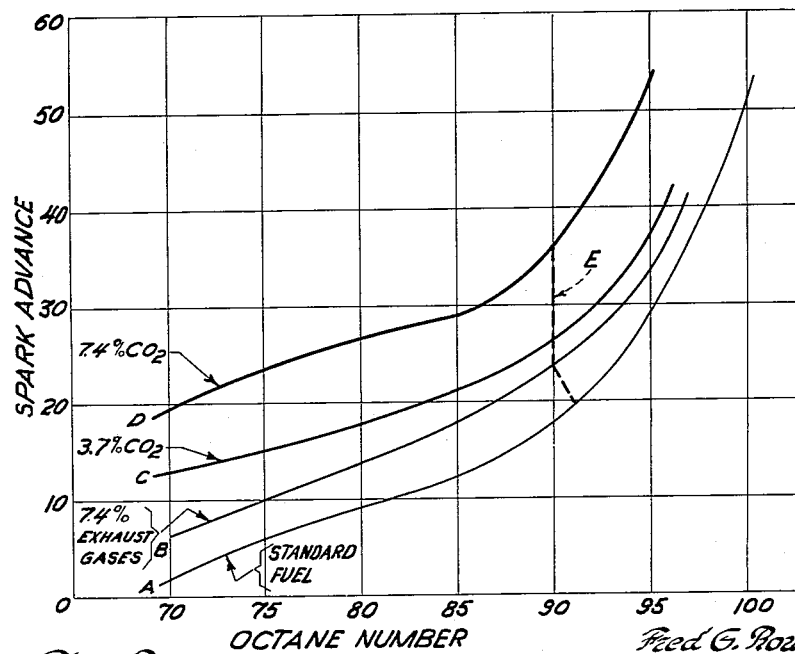
Figure 2 is a graph comparing the effects on automobile engine knocking of relatively small additions of carbon dioxide and exhaust gases to the engine air intake.

In Figure 2 is shown the effect of carbon dioxide on the tendency of an engine to knock. Curve A represents the minimum spark advance settings necessary to prevent engine knocking when using primary reference blends of various octane ratings. To obtain the data for this curve, nothing was added to the primary reference blends to affect their anti-knock properties. Points on this curve were obtained by using primary reference blends having varying octane ratings and determining the maximum allowable spark advance for each sample of fuel. This curve then is the base line, hereinafter referred to as the standard fuel-air charge, and the other curves illustrate the effect of adding noted percentages of inert gases to the basic charge.

Curve B illustrates the effect of using the same primary reference blends of curve A with 7.4% exhaust gases by volume of the intake air stream added to the air intake. The addition of other materials to the fuel supply system, in same volume percentage quantities, including water and nitrogen, gave experimental results very similar to those represented by curve B.

Curve C represents the addition of 3.7% carbon dioxide by volulme of the air intake stream to the same primary reference blend represented in curve A. As will be seen, the addition of a relatively small controlled amount of carbon dioxide produces a striking increase in the anti-knock properties, as represented by an increased border line spark advance, at any given octane rating.

Curve D illustrates that 7.4% carbon dioxide by volume of the air intake stream added to the original basic fuel-air charge as in curve A results in an even more greatly increased border line spark advance setting at any particular octane rating.

In Figure 2 the line E illustrates the effect of adding carbon dioxide to a particular commercial fuel of the type known as a "high-test" gasoline having a research octane rating of about 92. It will be seen that the addition of carbon dioxide to this particular gasoline greatly increases its anti-knock properties, as represented by an increase in border line spark advance setting, with but a slight effect on the octane rating of the gasoline. Inasmuch as carbon dioxide causes no harmful effects either to the fuel or to the engine, it may be used with present commercial fuels already containing another anti-knock material such as tetraethyl lead. Thus, it will be seen that by the controlled addition of a relatively small volume percentage of carbon dioxide the anti-knock properties of a fuel are greatly improved. The carbon dioxide, an inert material itself, leaves no residue to foul spark plugs or to coat the combustion chamber or cylinder walls. Carbon dioxide is relatively inexpensive, readily obtainable, and is easily handled with no problem of inflammability or freezing. In a preferred embodiment of the invention the carbon dioxide added to the fuel supply system is substantially pure carbon dioxide.

While the chemical kinetics of the combustion reaction, together with all the complex organic and physical chemical changes occuring during combustion are not completely understood, experimental results indicate that the injection of carbon dioxide reduces engine knocking primarily by upsetting the equilibrium conditions of the combustion reaction. As a result, the pressure and temperature in the cylinder are reduced. By reducing the pressures and temperatures, the fuel mixture is kept from burning too rapidly and unevenly. Instead of a sudden localized release of heat and excessive pressure in knocking, there is instead a smooth, steady travel of the combustion flame from the spark plug across the combustion chamber.

In a simplified form the theoretically perfect combustion reaction taking place in a cylinder may generally be represented by the following equation:

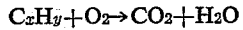

$$C_xH_y + O_2 \rightarrow CO_2 + H_2O$$

where $x$ and $y$ represent generally any given numerical values as found in conventional hydrocarbon fuels. In considering this reaction from the standpoint of ordinary mass action principles, the addition of one of the reaction products, in this simplified equation of either water or carbon dioxide, should tend to slow down the combustion reaction by upsetting the equilibrium conditions. From a purely theoretical consideration, it would appear that water vapor would be as effective as $CO_2$ since both compounds are reaction products. It has been found, however, that the injection of water vapor does not have as great an effect on the combustion reaction as $CO_2$. Further, as shown in Figure 2, the injection of exhaust gases containing all of the products of combustion including water, carbon dioxide and carbon monoxide also has but a slight effect on the speed of the combustion reaction and the engine knocking. However, it has now been discovered that the specific addition of carbon dioxide to the combustible fuel mixture produces a striking effect on the rate of the combustion reaction and engine knocking. Exactly why the addition of carbon dioxide to the fuel supply system should reduce engine knocking so effectively is not known. However, the present invention should not be restricted or limited by any theoretical explanation attempted herein, of course, inasmuch as, irrespective of any such explanation, we have discovered that the injection of carbon dioxide into the fuel supply system greatly reduces engine knocking.

In a practical application of this invention, the carbon dioxide, because it is completely miscible with the fuel-air mixture, may be injected at any point in the fuel supply system such as the air-intake stream or between the air-intake stream and the engine. The carbon dioxide may also be injected at a plurality of points in the system. If desired, the carbon dioxide may also be added to the unvaporized fuel. This method is limited by the rather low solubility of carbon dioxide in most liquid fuels. As used in this specification then, injection of carbon dioxide into the fuel supply system may mean injection at any suitable point or points in the system. In a preferred embodiment, the carbon dioxide may be injected into the intake manifold at a point just beyond the carburetor so that the air-fuel ratio will not be disturbed yet so that the carbon dioxide will be equally distributed to all the cylinders.

According to this invention, carbon dioxide may be introduced continuously into the fuel supply system if desired, since it does not harm the engine and is relatively inexpensive material. During most of the time of operation, however, the engine is operating under a relatively high manifold vacuum and does not need the carbon dioxide to prevent knocking. In a preferred embodiment of the invention, therefore, it is desirable to inject the carbon dioxide only when it is actually needed by the engine to prevent knocking. If desired, injection under these conditions may be regulated by using any conventional manually operated control valve, thus permitting the operator to inject carbon dioxide into the fuel supply when the motor starts to knock. Beneficial results have also been obtained when the carbon dioxide injection is regulated by an automatic control valve operating in responseto an opening of the throttle. However, since an increase in the engine intake manifold pressure is always indicative of conditions under which knocking will tend to occur, in a preferred method of applying the invention optimum results have been obtained when the injection of the carbon dioxide is regulated as to time, duration of injection and quantity injected by a control valve system responsive both to changes in intake manifold vacuum and to the throttle setting.

As a source of carbon dioxide, a standard cylinder of compressed carbon dioxide may be used. Such a cylinder, which, in an automobile, may be mounted under the hood on the firewall, provides a very satisfactory and practical method of supplying carbon dioxide. At the time the carbon dioxide is needed to prevent knocking, the engine manifold vacuum is very low. The carbon dioxide, under a positive pressure, thus may be released directly into the fuel supply system. It will be understood, of course, that as preferably used, the cylinder of compressed carbon dioxide may be equipped with a reducing valve to deliver the high pressure carbon dioxide to the control valve at a lower pressure of from about 1 to 10 p. s. i.

Referring now to Figure 3 of the drawings, there is schematically shown a type of mechanism in which the carbon dioxide is automatically injected into the engine fuel supply system of a motor vehicle in accordance with variations in engine load. With the arrangement illustrated, compressed carbon dioxide is stored in a high pressure cylinder or tank 16, which is suitably located in the motor vehicle, and conveyed through appropriate tubes or pipes 18, 20, 22 and 24 to the intake manifold 26. After leaving the cylinder 16, the carbon dioxide is bled through a pressure reducing valve 28 connected to the tube 18. In order to control the flow of carbon dioxide, a vacuum operated valve 30 and a valve 32 operated by the throttle linkage 34 are employed.

As will be seen from Figure 3, the valve 32 is actuated by the throttle linkage against a spring 36 so that it will be open only at throttle positions near full throttle. The directions of movement of the parts of the throttle valve linkage 34 as the accelerator pedal is depressed are indicated by the arrows. In this manner when the accelerator pedal has been depressed to a predetermined extent, the valve 32 will be open, permitting the carbon dioxide to flow from the storage cylinder 16 through the valve 32 and into the intake manifold 26. However, this will occur only when the ignition switch 50 is in the "on" position, as will be hereinafter more fully explained.

The vacuum operated valve 30 is open whenever the ignition switch is on and whenever the pressure in the intake manifold exceeds a predetermined value, such as when it is at or approaches atmospheric pressure, thereby allowing flow of the carbon dioxide from the cylinder 16 through pipes 18, 22 and 24 to the intake manifold. This may be accomplished by providing the valve 30 with a suitable flexible diaphragm 38 and helical compression spring 40. This diaphragm is actuated by the difference between atmospheric pressure and the sum of the intake manifold pressure and the force exerted by the spring 40. The intake manifold communicates with the spring side of the valve 30 through a tube or pipe 42 connected to the carburetor 44. Thus it will be seen that the flow rate of the carbon dioxide and the duration of carbon dioxide injection is regulated by changes in intake manifold pressure and the throttle setting.

In order to prevent the carbon dioxide from passing through the valve 30 when the motor vehicle is not in operation, a solenoid-operated valve 46 is located between tubes 18 and 20. This latter valve, which is electrically connected to the battery 48 through the ignition switch 50 of the automotive vehicle, is in the open position only when the ignition switch is turned on.

In general, the injection of carbon dioxide in relatively small, controlled amounts is preferred. While very beneficial results have been obtained when carbon dioxide is introduced in small but effective quantities not in excess of 10% by volume of the air-intake stream, in a preferred embodiment the carbon dioxide is injected in an amount ranging from 0.5% to about 2% by volume of the air-intake stream. Hence, an example of a typical combustible mixture incorporating the invention would be a gaseous mixture of air, a conventional hydrocarbon fuel, and the added carbon dioxide, such as a mixture containing from ten to twenty-one pounds of air per pound of hydrocarbon fuel with the carbon dioxide additive being present in an amount not exceeding 2% by volume of the air in the mixture. This is equivalent, of course, to a mixture of approximately 4.55 to 9.1% by weight of hydrocarbon fuel, 90.9 to 95.45% by weight of air to which carbon dioxide has been added. It has been found that in an automobile, knocking conditions exist on the average only from about 1–5% of the time the engine is operating. Thus, it will be seen that the injection of carbon dioxide only when needed thus would actually involve the consumption of a very small amount of carbon dioxide per gallon of fuel used.

While the method of this invention has been described in some detail as being applicable to automobile engines, it of course will be understood that it may be applied equally well to aircraft engines or other internal combustion engines where it is desired to reduce engine knocking.

The foregoing description of the present invention has been given for illustrative purposes and no undue limitations should be deduced therefrom. Accordingly, it is to be understood that variations and modifications capable of being accomplished by the mere exercise of skill of the art are to be embraced within the scope of the appended claims.

I claim:

1. A method of reducing the speed of combustion reactions in a multi-cylinder internal combustion engine which comprises injecting substantially pure carbon dioxide into the intake manifold of said engine at a pressure of about 1 to 10 pounds per square inch and at a flow rate equal to approximately 0.5% to 2% of the flow rate of the air intake stream, said carbon dioxide being introduced into said intake manifold at a point between the combustion chambers of said engine and that portion of the engine carburetor at which the air and hydrocarbon fuel are mixed to thereby not affect the air-fuel ratio of said engine and to distribute the carbon dioxide approximately equally to said combustion chambers, the flow rate of said carbon dioxide and the duration of said injection being regulated by an automatic control valve system operating in response to changes in engine manifold pressure and to the throttle setting of said engine.

2. A method of reducing knocking in an internal combustion engine which comprises injecting carbon dioxide into the fuel supply system of said engine at a pressure of about 1 to 10 pounds per square inch and in an amount equal to approximately 0.5% to 10% by volume of the air intake stream, said carbon dioxide being introduced into said fuel supply system at a point between a combustion chamber of said engine and that portion of a carburetor thereof at which the air and hydrocarbon fuel are mixed, the amount of carbon dioxide injected and the duration of said injection being regulated by an automatic control valve system responsive to variations in engine load.

References Cited in the file of this patent

UNITED STATES PATENTS

| Number | Name | Date |
| --- | --- | --- |
| 1,371,397 | Ricardo | Mar. 15, 1921 |
| 1,803,213 | Schuddig | Apr. 28, 1931 |
| 1,843,646 | Moore | Feb. 2, 1932 |
| 2,087,116 | Prentiss | July 13, 1937 |
| 2,147,670 | Pratt | Feb. 21, 1939 |
| 2,303,050 | Jones | Nov. 24, 1942 |
| 2,354,179 | Blanc | July 25, 1944 |